United States Patent [19]

Hess et al.

[11] Patent Number: 5,227,356
[45] Date of Patent: Jul. 13, 1993

[54] CATALYST CONTAINING METAL OXIDES FOR USE IN THE DEGENERATIVE OXIDATION OF ORGANIC COMPOUNDS PRESENT IN EXHAUST GASES FROM COMBUSTION PLANTS

[75] Inventors: Klaus Hess, Bad Duerkheim; Bernd Morsbach, Ludwigshafen; Ronald Drews, Limburgerhof; Wolfgang Buechele, Ludwigshafen; Helmut Schachner, Walldorf, all of Fed. Rep. of Germany

[73] Assignee: BASF Aktiengesellschaft, Ludwigshafen, Fed. Rep. of Germany

[21] Appl. No.: 879,008

[22] Filed: May 6, 1992

[30] Foreign Application Priority Data

May 18, 1991 [DE] Fed. Rep. of Germany ....... 4116364

[51] Int. Cl.$^5$ .................. B01J 21/06; B01J 23/20; B01J 23/24; B01J 27/053
[52] U.S. Cl. .................. 502/217; 423/245.3
[58] Field of Search .................. 502/217; 423/245.3

[56] References Cited

U.S. PATENT DOCUMENTS

| | | | |
|---|---|---|---|
| 4,059,675 | 11/1977 | Yang et al. | 423/240 |
| 4,466,947 | 8/1984 | Imanari et al. | 502/217 X |
| 4,929,586 | 5/1990 | Hegedus et al. | 502/217 |
| 4,952,548 | 8/1990 | Kato et al. | 502/217 |

FOREIGN PATENT DOCUMENTS

| | | |
|---|---|---|
| 252521 | 7/1987 | European Pat. Off. . |
| 2640906 | 3/1977 | Fed. Rep. of Germany . |
| 3531871 | 7/1989 | Fed. Rep. of Germany . |
| 3804722 | 8/1989 | Fed. Rep. of Germany . |
| 88/00483 | 1/1988 | PCT Int'l Appl. . |

OTHER PUBLICATIONS

Chem. Abstr. 112 (26), 239 884j (1990) (ref of JP 02 035 914).

*Primary Examiner*—W. J. Shine
*Attorney, Agent, or Firm*—Keil & Weinkauf

[57] ABSTRACT

A metal oxide-containing catalyst which also contains, besides oxides of titanium and/or zirconium, oxides of vanadium and/or niobium and oxides of molybdenum, tungsten, and/or chromium, sulfates of alkaline earth metals, and which is used in a process for the degenerative oxidation of organic compounds present in exhaust gases from combustion plants.

9 Claims, No Drawings

CATALYST CONTAINING METAL OXIDES FOR USE IN THE DEGENERATIVE OXIDATION OF ORGANIC COMPOUNDS PRESENT IN EXHAUST GASES FROM COMBUSTION PLANTS

The present invention relates to a metal oxide-containing catalyst for use in processes for the degenerative oxidation of organic compounds, especially organic compounds containing chlorine, which are present in the off-gases from combustion plants, and to a method of preparing such a catalyst, and to a process for the regenerative oxidation of said organic compounds.

Exhaust gases from combustion plants frequently contain unburnt organic compounds which must be removed therefrom to reduce environmental pollution.

The removal of such organic compounds from combustion off-gases may be effected by thermal post-combustion methods in which the gas is subjected to further combustion induced by burning additional fuel. The drawbacks of such methods are the consumption of additional fuel and the very high cost of operations involving high temperatures.

Another known method is to remove organic compounds from combustion off-gases by catalytic post-combustion at lower temperatures and without the use of additional fuel. Supported noble metal catalysts have been proposed for this purpose (DE-OS 2,640,90). These catalysts are used in particular in the purification of automobile exhaust gases.

Catalysts which may contain $BaSO_4$ are described in U.S. Pat. No. 4,929,586 and DE 3,531,871 C2. In the former case, however, the $BaSO_4$ is used only as a coating and not in intimate admixture with other components, and the catalyst disclosed in DE 3531871 C2 contains no oxides of molybdenum, tungsten and/or chromium. Furthermore, the catalysts mentioned in these two disclosures are employed for a different purpose—the removal of nitric oxides by reduction.

DE 3,804,722 A1 describes a process for oxidizing compounds by catalytic reburning which makes use of mixed oxide catalysts instead of noble metal catalysts, which mixed oxide catalysts contain, in addition to titanium dioxide, at least one oxide chosen from the following group of transition metals: vanadium, chromium, manganese, iron, cobalt, nickel, copper, zinc, zirconium, molybdenum, tungsten, platinum, and rhodium.

A similar catalyst used for removing chlorinated organic compounds from exhaust gases is described in *Chemical Abstracts* 112 (26), 239,884j (referred to in JP-OS 02-035,914).

Polychlorinated dibenzodioxins and dibenzofurans are known to be a particularly problematic group of chlorinated organic compounds. The decomposition of these compounds by heating in the presence of a catalyst is described in EP 0,252,521 A1, in which the catalysts mentioned are generally referred to as "ash" or are a selection of metals or oxides, carbonates, or silicates thereof. With respect to catalysts for effecting degenerative oxidation in the presence of air, the only examples stated are copper/chromium oxides on $SiO_2$ and NiO.

Experiments have shown that the prior art catalysts containing metal oxides, especially $TiO_2$, induce only unsatisfactory degeneration of organic compounds in exhaust gases coming from combustion plants, this particularly applying to chlorinated organic compounds and more particularly to said dioxins.

Thus it is an object of the present invention to provide a process and its associated catalyst, by means of which organic compounds and especially chlorinated organic compounds present in exhaust gases coming from combustion plants are virtually completely degraded by oxidation thereof.

We have now found that this object is achieved by a process which makes use of a metal oxide-containing catalyst which contains the following components:

a) oxides of titanium and/or zirconium,
b) oxides of vanadium and/or niobium,
c) oxides of molybdenum, tungsten, and/or chromium,
d) sulfates of alkaline earth metals in an amount of from 5 to 40% w/w, based on the total weight of the catalyst.

Preferably, at least components a) and d) are present in the form of an intimate mixture.

We have found, surprisingly, that the addition of alkaline earth metal sulfates produces a catalyst which is clearly superior to catalysts composed only of the prior art metal oxides, as regards the rate of degeneration achieved. This marked reduction in the amount of emitted organic compounds is of particular significance in the case of dioxins.

Good results are achieved when the catalyst additionally contains, as component e), Pd, Pt, Ru, Rh, Ir, and/or Os in metallic form or in the form of their oxides, the concentration thereof being from 0.01 to 3% w/w, based on the total weight of the catalyst, these preferably being in the form of a coating applied to the surface of the catalyst. These supplementary components can cause an additional increase in the rate of degeneration.

The catalyst preferably contains the following components: titanium dioxide, especially in the form of anatase, vanadium oxide in the form of $V_2O_5$, tungsten oxide in the form of $WO_3$, barium sulfate, and, optionally, platinum or palladium.

The alkaline earth metal sulfates are present in the catalyst in a concentration of from 5 to 40% w/w and preferably from 8 to 34% w/w and more preferably from 10 to 30% w/w.

The concentration of component b) is usually from 0.5 to 8% w/w and preferably from 2 to 5% w/w, calculated as pentoxide, and that of component c) is from 5 to 15% w/w and preferably from 8 to 12% w/w, calculated as trioxide, based in each case on the total weight of the catalyst.

In addition to the aforementioned components, the catalyst of the invention may contain zinc in the form of its oxides or sulfates, this being particularly desirable when the exhaust gas contains arsenic. The use of zinc compounds in catalysts in processes for the removal of nitric oxides from combustion off-gasses containing arsenic is described in DE-OS 3,821,480.

The concentration of the zinc compound is such that the atomic ratio of component a) to the zinc compound is from 1:0.009 to 1:0.028. The zinc compounds are mainly in the form of zinc oxide, but they can, if desired, be in the form of a zinc compound which is stable to the working temperature of the catalyst, e.g., zinc sulfate.

The catalyst also contains prior art processing aids provided they do not disintegrate on calcination.

The catalyst mixture is made up to 100% w/w with component a).

The catalyst of the invention may be prepared in a variety of ways, but it is necessary to ensure that at least components a) and d) are present in the form of an intimate mixture. Prior art methods of preparing catalysts containing metal oxides are indicated in DE 3,906,136 C1 p. 2.

One possible embodiment comprises intimately mixing a blend of alkaline earth metal sulfate, titanium oxides, tungsten oxides and/or molybdenum oxides and a compound of vanadium such as ammonium metavanadate, vanadium oxalate, or vanadium oxide and adding the processing aid mentioned in DE 3,906,136 C1.

A solution of a zinc compound may be added during the mixing operation, if desired.

The plasticized material can be processed to a variety of geometrical shapes, after which it is dried at a temperature of from 50° to 150° C., preferably 60° to 130° C., and calcined at a temperature of from 350° to 750° C., preferably from 450° to 650° C.

The titanium oxide used in the catalysts of the invention is preferably produced from metatitanic acid, and the tungsten oxide preferably from ammonium paratungstate.

Alternatively, alkaline earth metal sulfates may be added to a homogeneous solution of components a), b), and c), which mixture may then be evaporated down, dried and converted to an oxide/sulfate mixture by calcination at the aforementioned temperatures. Another method is to isolate the components from said solution by precipitation and to convert the precipitates to oxides by hydrolysis.

If it is desired to prepare the catalyst in such a manner that at least one of the components b) and c) is applied in the form of a sol to pre-shaped units, the procedure will be to impregnate the pre-formed substrate having the final shape of the catalyst with at least one of the active ingredients in the form of a sol. The catalyst can take the form of, say, honeycomb units, plates, pellets, or extrudates. If the shaped catalyst units are to contain more than one catalytically active ingredient, it is not necessary to apply all of said active ingredients by impregnation with a sol as proposed by the present invention. Instead, it is sufficient to apply at least one of said components by said sol impregnation method. Thus, for example, the supporting material may contain the other components, e.g. in the form of their oxides, before it is shaped, or the pre-shaped substrate may be previously impregnated with solutions of compounds of the other active ingredients, after which it is calcined and then coated with the remaining component(s) by said sol impregnation. It is preferred to use compounds of vanadium for the sol impregnation proposed by the invention.

The preparation of the sols of vanadium, tungsten, and/or molybdenum to be used for such impregnation is effected in known manner. The vanadium sol is preferably a $V_2O_5$ sol such as is obtained when ammonium vanadates or alkali metal vanadates are treated with acids (cf. *Gmelins Handbuch der Anorganischen Chemie*, 8th Edition, *Vanadium*, Part B, Lieferung 1, System No. 48, pp. 98–101).

In the case of molybdenum, it is preferred to use sols of molybdic acid prepared in a manner similar to the $V_2O_5$ sols by treatment of alkali metal molybdates with acids followed by dialysis of the resulting acidic solutions (cf. *Gmelins Handbuch der Anorganischen Chemie*, 8th Edition 1935, *Molybdenum*, System No. 53, pp. 111–112). The tungstic sols are preferably sols of tungstic acid, which may again be prepared by treatment of alkali metal tungstates with mineral acids (cf. *Gmelins Handbuch der Anorganischen Chemi*, 8th Edition 1933, *Tungsten*, System No. 54, p. 128).

Following impregnation of the substrate with the sol, it is dried at a temperature of from 80° to 130° C. and then calcined at a temperature of from 400° to 600° C.

The aforementioned sol impregnation process is described in detail in the prior German Application P 40 25 587.5. The catalysts disclosed therein are used for a different purpose, however, and contain no alkaline earth metal sulfates.

The additional component e) is added to the other catalyst ingredients in a suitable manner. We prefer to apply this component to the pre-shaped catalyst by impregnation such that, after drying, it forms a coating or film covering parts of the catalyst surface.

The catalysts thus produced are installed in the flow of exhaust gases leaving combustion units. This is effected in known manner and is described, for example, in DE 3,804,722 A1.

The catalysts can take any desired form; for example they can be in the form of extrudates or pellets. Preferably, however, they are used in the form of honeycomb units in which all of the channels are parallel to each other.

One class of organic compounds to be subjected to degenerative oxidation comprises, in addition to CO, low molecular weight saturated or unsaturated $C_1$–$C_{10}$-hydrocarbons such as butane, pentane, hexane, heptane, and propene, but other organic compounds can be removed from exhaust gases by means of the catalyst of the invention. A list of examples of such compounds is given in DE 3,804,722 A1, column 5.

A second class of compounds which can be degraded with the aid of the catalyst of the invention comprises chlorinated compounds such as polychlorinated biphenyls and, in particular, polychlorinated dibenzodioxins and polychlorinated dibenzofurans.

The combustion plants under consideration are, in particular, refuse incinerators, residue burners, and industrial furnaces.

Degenerative oxidation carried out in the presence of said catalyst is effected at a temperature of from 150° to 600° C., preferably from 250° to 400° C. The space velocities range from 1,000 to 150,000 m³ (S.T.P.) per m³ of catalyst per hour, preferably from 2,000 to 100,000 m³ (S.T.P.) per m³ of catalyst per hour.

PREPARATION OF CATALYST

Examples 1 and 2

A mixture of $TiO_2$ and $WO_3$ powders is dry-blended with an appropriate amount of barium sulfate. To 625 kg of this powder there are added 430 l of water, 58 l of 25% aqueous ammonia solution, and a solution of 10.5 kg of ammonium metavanadate in 9 kg of monoethanolamine and 30 l of water. The pH is adjusted to above 9.5 and the mixture is kneaded at 70° C. until the moisture content is between 24 and 27%.

Following the addition of a further 152 l of water, 9.4 kg of $SiO_2$ 20 kg of clay, 33 kg of glass fibers (1.5 mm), 10 kg of polyethylene oxide, 6.5 kg of carboxylmethyl cellulose, and 6.5 kg of lactic acid, kneading is continued at 70° C. until the moisture content is between 27 and 30%. The pH is above 7.0.

The mixture is cooled to room temperature, and 16 l of 25% aqueous ammonia solution, 20 l of water, and 20 kg of glass fibers (3 mm) are added, after which the mixture is kneaded until its plasticity (flow limit in a ball rheometer) is about 21 kg/cm². The kneading power is kept constant by the addition of water. The moisture content is now between 27 and 29%, and the pH is above 8.3.

The resulting composition is extruded to honeycomb units at an extrusion pressure of about 20 bar, and these are dried at 110° C. and calcined for 6 hours at 600° C.

Examples 3 and 4

The catalysts are prepared in a manner similar to that described in Examples 1 and 2. Following calcination, they are impregnated with a $Pt(NO_3)_2$ solution and redried at 110° C.

Examples 5 and 6

The catalysts are prepared as described in Example 4, except that a $Pd(NO_3)_2$ solution is used for impregnation instead of a $Pt(NO_3)_2$ solution.

Comparative Examples 1 and 2

The catalysts are prepared in the manner described in Examples 1 and 2, except that no barium sulfate is included.

The contents of $BaSO_4$, $V_2O_5$, $WO_3$, Pt and Pd in the catalysts are listed in Table 1 below.

TABLE 1

| | BaSO₄ % w/w | WO₃ % w/w | V₂O₅ % w/w | Pt % w/w | Pd % w/w |
| --- | --- | --- | --- | --- | --- |
| Example 1 | 10 | 10 | 1.2 | — | — |
| Example 2 | 30 | 10 | 1.2 | — | — |
| Example 3 | 30 | 10 | 1.2 | 0.1 | — |
| Example 4 | 30 | 10 | 3.0 | 0.1 | — |
| Example 5 | 30 | 10 | 3.0 | — | 0.05 |
| Example 6 | 30 | 10 | 3.0 | — | 0.1 |
| Comp. Example 1 | — | 9 | 1.2 | — | — |
| Comp. Example 2 | — | 9 | 3.0 | — | — |

The catalysts 1 to 6 of the invention and the comparative catalysts 1 and 2 are installed, for test purposes, in the exhaust of a refuse incinerator. The content of dioxins in terms of ng of toxic equivalents (TE) per m³ is determined upstream and downstream of the catalyst.

The results are listed in Table 2 below.

TABLE 2

| | Temperature [°C.] | Space Velocity [m³/m³ of cat./h (S.T.P.)] | Dioxin Content (ng of TE/m³) | |
| --- | --- | --- | --- | --- |
| | | | Upstream | Downstream |
| Example 1 | 310 | 2200 | 6 | 4 |
| Example 2 | 305 | 2200 | 5.5 | 1 |
| Example 3 | 310 | 2200 | 6 | 0.1 |
| Example 4 | 300 | 2200 | 5 | 0.05 |
| Example 5 | 305 | 2200 | 5.5 | 0.1 |
| Example 6 | 300 | 2200 | 6 | 0.05 |
| Comparative Example 1 | 310 | 2200 | 6 | 5.5 |
| Comparative Example 2 | 310 | 2200 | 5.5 | 4.5 |

The catalysts of Examples 2, 5 and 6 are also tested to investigate their oxidizing action on CO, propene, and pentane. Each of these contaminants is added to a test gas consisting of 3% v/v of $O_2$, 1% v/v of $CO_2$, and 5% v/v of $H_2O$, in nitrogen. The catalysts are used in the form of gravel having a particle size of from 2 to 4 mm. The test criterion is the temperature required to convert 95% of the contaminant at a space velocity of 20,000 m³ (S.T.P.) per m³ of catalyst per hour. The results are listed in Tables 3 to 5 below.

TABLE 3

Contaminant: CO (Concentration 1% v/v)

| | Temperature required for 95% conversion of CO [°C.] |
| --- | --- |
| Example 2 | 497 (CO conversion 88%) |
| Example 5 | 75 |
| Example 6 | 70 |
| Comp. Example 2 | 497 (CO conversion 68%) |

TABLE 4

Contaminant: Propene (Concentration 3,000 ppm)

| | Temperature Required for 95% Conversion of $C_3H_6$ [°C.] |
| --- | --- |
| Example 2 | 315 |
| Example 5 | 230 |
| Example 6 | 220 |
| Comp. Example 2 | 360 |

TABLE 5

Contaminant: Pentane (Concentration 2,000 ppm)

| | Temperature Required for 95% Conversion of $-C_5H_{12}$ [°C.] |
| --- | --- |
| Example 2 | 442 |
| Example 5 | 349 |
| Example 6 | 332 |
| Comp. Example 2 | 491 |

The results listed in Tables 2 to 5 show that although the catalysts of Comparative Examples 1 and 2 exhibit some capacity to degenerate organic compounds, the addition of $BaSO_4$ effects considerable improvement thereupon, as evidenced by the results obtained with the catalysts of Examples 1 and 2.

The best rates of degeneration of the organic compounds are achieved when $BaSO_4$ is present in the catalyst in combination with a small amount of a noble metal such as Pt or Pd (Examples 3 to 6).

We claim:

1. A catalyst containing metal oxides for use in processes for degenerative oxidation of organic compounds present in exhaust gases from combustion plants, containing the following components:

a) oxides of titanium and/or zirconium,
b) oxides of vanadium and/or niobium,
c) oxides of molybdenum, tungsten, and/or chromium,
d) sulfates of alkaline earth metals in an amount of from 5 to 40% w/w, based on the total weight of the catalyst, at least components a) and d) being present in the catalyst in the form of an intimate mixture.

2. A catalyst as defined in claim 1, containing, as additional component e), Pd, Pt, Ru, Rh, Ir, and/or Os in metallic form or in the form of their oxides, in a concentration of from 0.01 to 3% w/w, based on the total weight of the catalyst.

3. A catalyst as defined in claim 1, containing, as component a), titanium oxide, as component b), vanadium oxide, as component c), tungsten oxide, as component d), barium sulfate, and optionally, as component e), platinum or palladium.

4. A catalyst as defined in claim 1, additionally containing zinc in the form of its oxides or sulfates.

5. A process for the preparation of a catalyst as claimed in claim 1 in which the components a), d), and optionally b), c) or precursors thereof are blended and shaped units are formed from the resulting mixture, wherein at least one of the components b) and c) is applied in the form of a sol to the pre-shaped units.

6. A catalyst as defined in claim 2, wherein the additional component e) forms a coating on the surface of the catalyst.

7. A catalyst as defined in claim 1, wherein component a) is in the form of anatase.

8. A catalyst as defined in claim 1, wherein component b) is $V_2O_5$.

9. A catalyst as defined in claim 1, wherein component c) is $WO_3$.